(12) United States Patent
Bolinis et al.

(10) Patent No.: US 6,464,152 B1
(45) Date of Patent: Oct. 15, 2002

(54) SELF-CLEANING PRESSURE COMPENSATING IRRIGATION DRIP EMITTER

(75) Inventors: Christos Bolinis, Athens (GR); Andreas Metaxes, Limassol (CY)

(73) Assignee: Eurodrip, S.A., Athens (GR)

( * ) Notice: Subject to any disclaimer, the term of this patent is extended or adjusted under 35 U.S.C. 154(b) by 0 days.

(21) Appl. No.: 09/544,847

(22) Filed: Apr. 6, 2000

(51) Int. Cl.$^7$ .............................................. B05B 15/00
(52) U.S. Cl. ....................... 239/542; 239/547; 239/571; 239/106; 239/113
(58) Field of Search ................................ 239/542, 576, 239/571, 547, 106, 107, 112, 113

(56) References Cited

U.S. PATENT DOCUMENTS

| | | | |
|---|---|---|---|
| 4,424,936 A | * | 1/1984 | Marc ............................ 239/542 |
| 5,628,462 A | * | 5/1997 | Miller .......................... 239/542 |
| 6,085,986 A | * | 7/2000 | Yu ............................... 239/542 |

* cited by examiner

Primary Examiner—Christopher Kim
(74) Attorney, Agent, or Firm—Nydegger & Associates

(57) ABSTRACT

A self-cleaning pressure compensating drip emitter for controlling fluid flow through a hole in an irrigation line includes an enclosing sidewall having two ends, and formed with a ledge between the ends. A cover extends from the sidewall to establish an antechamber between the ledge and the cover. An entrance allows fluid from the irrigation line to enter the antechamber with little pressure reduction. An outlet extends into a fluid chamber established between the ledge and the second end of the sidewall. An opening allows pressure reduced fluid from the irrigation line to enter the fluid chamber. A membrane is positioned on the ledge for movement between a flushing configuration at low line pressures and an operational configuration at higher line pressures. In the flushing configuration, the membrane allows fluid to flow from the antechamber to the fluid chamber and through the outlet for flushing the emitter. In the operational configuration the membrane seals against the ledge preventing flow from the antechamber to the fluid chamber, and interacts with the outlet to partially restrict flow from the fluid chamber though the outlet to provide a drip flow through the hole in the irrigation line.

6 Claims, 4 Drawing Sheets

SELF-CLEANING PRESSURE COMPENSATING IRRIGATION DRIP EMITTER

FIELD OF THE INVENTION

The present invention pertains generally to devices for use as drip irrigation emitters. More particularly, the present invention pertains to drip irrigation emitters that provide a substantially constant drip flow-rate over a wide range of line pressures. The present invention is particularly, but not exclusively, useful as a self-cleaning, pressure-compensating, irrigation drip emitter.

BACKGROUND OF THE INVENTION

Many plants require sub-surface irrigation for effective growth and function. In particular, for large commercial operations, localized irrigation that is characterized by the administration of water in the vicinity of each plant can effectively conserve water and help prevent soil erosion due to runoff. Further, localized, low-flow irrigation over a relatively long irrigation cycle can result in deep subsurface water penetration which is beneficial for plants.

For many years, drip emitters have been used for delivering localized, low flow irrigation to the roots of plants. Generally, in use, drip emitters are placed in fluid contact with a water feed line such as a half-inch diameter irrigation line. To accomplish localized delivery of water, some drip emitters rely on the use of one or more small orifices to create a drip flow. When used, such an orifice or restriction emitter reduces the water pressure and flow rate in the irrigation line to a lower pressure and lower flow rate for the water as it passes through the orifice. Specifically, the reduced pressure and flow rate is suitable for creating a drip flow.

Unfortunately, simple orifice or restriction emitters often become clogged due to particulates in the feed line or debris that enters the emitter from outside the irrigation line. Further, simple orifice or restriction emitters are not pressure compensating, and consequently, the flow of drips through the simple emitter varies as the pressure in the irrigation line varies. The pressure within an irrigation line may, however, vary for several reasons. For example, the supply pressure may vary over time due to changes in water demand. Also, when long irrigation lines are used, a pressure drop along the length of the irrigation line may occur due to the frictional forces presented by the irrigation line. Further, when irrigation lines are used on hilly terrain, the pressure within the line may fluctuate due to variations in hydrostatic pressure. Consequently, emitters that lack the ability to compensate for pressure variations may cause uneven watering and cause the irrigation system to be hard to control.

Heretofore, drip emitters containing a pressure compensating flexible membrane have been disclosed. In these emitters, one side of the membrane is exposed to irrigation line pressure, while the opposite side of the membrane is exposed to a reduced pressure. For example, the reduced pressure can be created by forcing a portion of the water from the irrigation line through a restrictor or labyrinth. This pressure differential on opposite sides of the membrane causes the flexible membrane to deform. In particular, the higher line pressure can be used to force the flexible membrane into a slot where reduced pressure water is flowing. As the line pressure increases, the membrane will be pressed further into the slot, decreasing the effective cross-section of the slot and thus restricting flow through the slot. As described further below, the result is a constant flow through the emitter over a range of line pressures. Unfortunately, the slot is subject to clogging in the same fashion as the simple orifice emitter. Further, the membrane is required to form a seal with the edge of the slot confining flow to the slot. Unfortunately, particulate buildup may also interfere with the membrane seal causing non-uniform flow.

One attempt to solve the problems associated with particulate buildup in a pressure compensating emitter uses the reduced-pressure water from the labyrinth to clean the slot and sealing surfaces during initial pressurization of the irrigation line. In particular, such an emitter is disclosed by Miller in U.S. Pat. No. 5,628,462 which issued May 13, 1997, entitled "Drip Irrigation Emitter," in which a chamber is created between the slot and the membrane. For the emitter disclosed by Miller, during initial pressurization of the irrigation line, while the membrane is only slightly deformed, the chamber is flushed with reduced-pressure water delivered from the restrictor or labyrinth. As the line pressure increases, the membrane deforms, sealing off the chamber from reduced pressure water, and restricting flow through the slot. Unfortunately, the reduced pressure water may be ineffective in adequately cleaning the slot and membrane.

In light of the above it is an object of the present invention to provide devices suitable for the purposes of providing a constant drip flow in response to a varying line pressure without becoming clogged. It is another object of the present invention to provide a self-cleaning drip emitter that uses water that is not pressure reduced to self-clean the membrane and slot. Yet another object of the present invention is to provide an irrigation dripper which is easy to use, relatively simple to manufacture, and comparatively cost effective.

SUMMARY OF THE PREFERRED EMBODIMENTS

The present invention is directed to a self-cleaning, pressure compensating drip emitter that is bonded to the inside wall of an irrigation line. The emitter includes an enclosing sidewall that extends from the inner wall of the irrigation line to a cover. The sidewall is formed with a ledge that is located between the cover and the inner wall of the irrigation line. A flat, flexible membrane having two opposed sides is positioned between the ledge and the cover. A fluid chamber surrounded by the sidewall is thus created between one side of the membrane and the inner wall of the irrigation line. Further, an antechamber surrounded by the sidewall is thus created between the ledge and the cover. The cover contains one or more holes to allow fluid communication between the lumen of the irrigation line and the antechamber. Consequently, one side of the membrane is in fluid communication with the fluid chamber and the other side of the membrane is in fluid communication with the lumen of the irrigation line.

Further, an outlet is provide for the fluid chamber to allow fluid to pass from the fluid chamber to the outside of the irrigation line. Within the fluid chamber, the outlet has an aperture where fluid can enter the outlet from the fluid chamber. The outlet is further formed with a valve seat surrounding the aperture, and the valve seat is formed with a slot. A valve may be mounted on the flexible membrane for cooperation with the valve seat to form a seal, and for cooperation with the slot to restrict a portion of flow within the slot.

Two passageways allow fluid from the lumen of the irrigation line to enter the fluid chamber for subsequent exit from the irrigation line through the outlet. The first passageway, or flushing passageway, is a direct passageway from the lumen of the irrigation line to the fluid chamber. Importantly, the flushing passageway first enters the antechamber from an entrance located in the sidewall between the ledge and the cover. The second passageway, or operational passageway, is formed as a labyrinth between the lumen of the irrigation line and the fluid chamber. Importantly, the operational passageway enters the chamber from an opening in the sidewall that is located between the ledge and the aperture of the outlet. The operational passageway reduces the pressure of the fluid from the irrigation line to create a drip flow during steady-state operational flow conditions.

During operation, fluid is supplied to the irrigation line from a fluid source. Initially, the pressure within the irrigation line is low as the fluid from the source flows into the irrigation line, displacing trapped air. Gradually the pressure in the line increases until a steady-state pressure is established in the irrigation line. During the initial pressurization of the irrigation line, the pressure on both sides of the flexible membrane is low and the flexible membrane does not deform or block either of the passageways. Consequently, fluid from the direct flushing passageway passes into the antechamber through the sidewall at the entrance. From the antechamber, the fluid passes between the ledge and the membrane and enters the fluid chamber where it effectively flushes any particulates from the chamber, valve seat, aperture, slot and outlet to the outside of the irrigation line.

As the pressure within the irrigation line increases, the differential pressure between the line pressure on one side of the membrane and the reduced fluid chamber pressure on the opposite side of the membrane becomes significant. As this differential pressure begins to increase, several events take place. First, under relatively small differential pressures, the membrane is forced against the ledge of the chamber creating a seal which prevents the fluid from flowing through the flushing passageway and entering the fluid chamber.

Next, further increases in pressure differential will cause the membrane to deform and collapse into the chamber, causing the valve to contact the valve seat. This partial blocking of the chamber and aperture will reduce the flow of fluid from the operational passageway through the chamber and into the outlet. Subsequent increases in pressure differential will cause the membrane to further deform resulting in the valve forming a seal with the valve seat. At these pressure differentials, flow is limited to fluid from the operational passageway flowing into the chamber and entering the outlet through the slot in the valve seat. Additional increases in pressure differential will force the valve into a portion of the slot, thereby partially restricting the flow of fluid through the slot.

In summary, as the pressure in the irrigation line increases, the differential pressure across the membrane will increase. As the differential pressure across the membrane increases, the membrane and valve will cause a series of restrictions within the chamber, with each restriction causing a further reduction of flow through the outlet. At the same time, the increases in line pressure will cause the pressure of the fluid entering the chamber from the operational passageway to increase. However, constant flow through the outlet is achieved in spite of the varying line pressure because the increased pressure in the operational passageway is offset by the restrictive effects of the membrane and valve.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
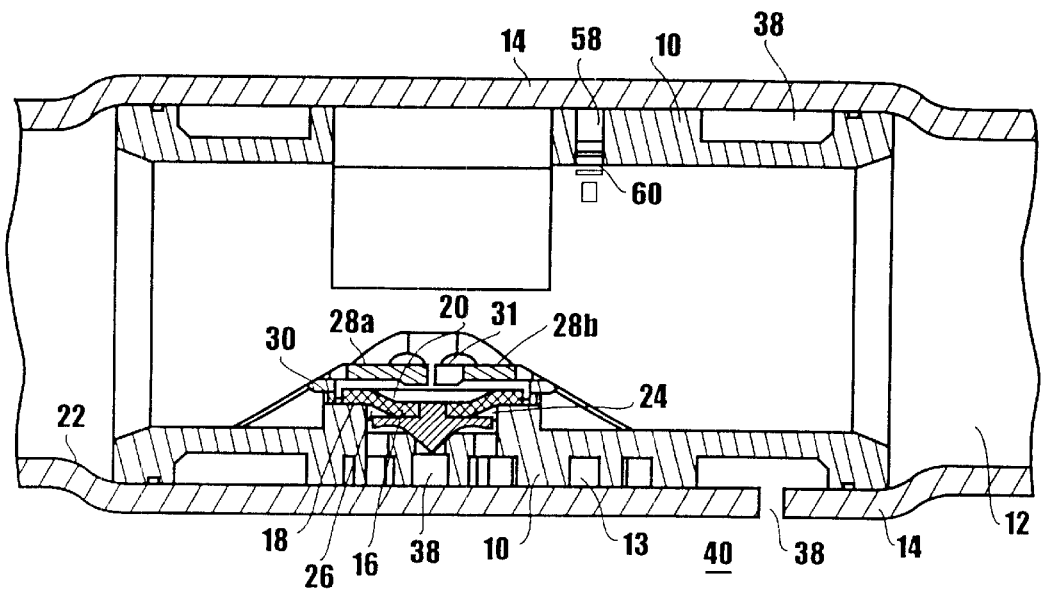
FIG. 1 is a cross-sectional view of an emitter having features of the present invention mounted in the lumen of an irrigation line.
Figure 2:
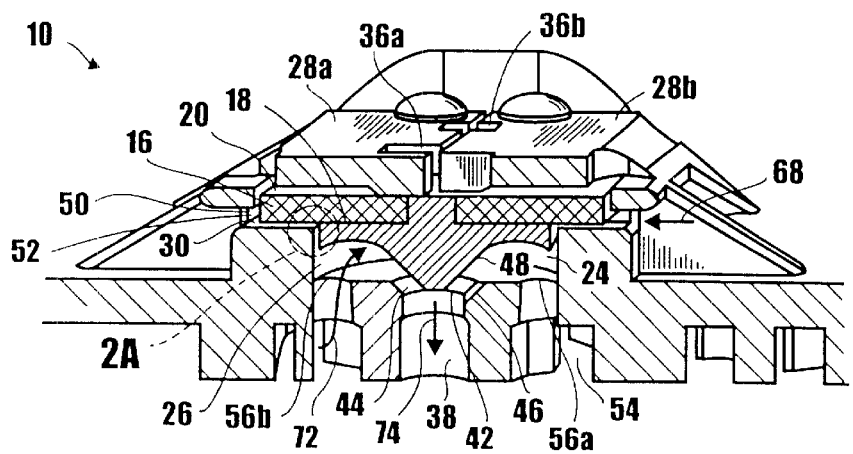
FIG. 2 is a perspective view in partial cross-section of a portion of an emitter having features of the present invention showing the fluid chamber, membrane and outlet.
Figure 2A:
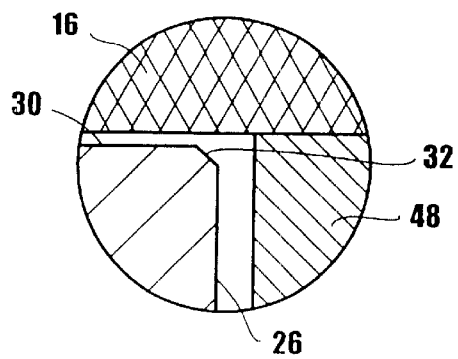
FIG. 2A is an enlarged view of a portion of the emitter as indicated by line 2A in FIG. 2, showing the beveled edge between the sidewall and the ledge.
Figure 2B:
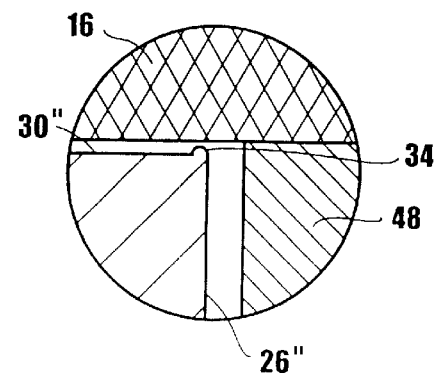
FIG. 2B is an enlarged view as in FIG. 2A showing an alternate embodiment in which a lip is formed on the edge between the sidewall and the ledge.

Referring initially to FIG. 1, a self-cleaning, pressure compensating irrigation drip emitter in accordance with the present invention is shown and designated 10. As seen in FIG. 1, the emitter 10 is shown installed in the lumen 12 of an irrigation line 14. Further, portions of the emitter 10 are in contact with the irrigation line 14 thereby creating sealed fluid passageways such as exemplary passageway 13. To create the contact between the emitter 10 and the irrigation line 14, any method known in the pertinent art such as adhesive or thermal bonding may be employed. By cross-referencing FIGS. 1 and 2, it can be seen that the emitter 10 includes a flexible membrane 16 having a side 18 and an opposed side 20. The flexible membrane 16 is positioned inside the irrigation line 14 at a distance from the inner wall 22 of the irrigation line 14 to create a fluid chamber 24 between the flexible membrane 16 and the inner wall 22. For purposes of the present invention, the flexible membrane 16 can be made of any elastic material known in the pertinent art such as metal, rubber or plastic, and may include a protective coating. A sidewall 26 partially surrounds the fluid chamber 24, extending from the inner wall 22 of the irrigation line 14 to covers 28a,b of the emitter 10. The sidewall 26 and the other portions of the emitter 10 (except the flexible membrane 16 described above) are preferably made of molded plastic. The sidewall 26 is further formed with a ledge 30 between the covers 28a,b and the fluid chamber 24. An antechamber 31 surrounded by the sidewall 26 is created between the covers 28a,b and the ledge 30. As shown in FIG. 2A, the edge 32 between the sidewall 26 and the ledge 30, is preferably beveled. Alternatively, as shown in FIG. 2B, a lip 34 can be formed between the sidewall 26" and the ledge 30". As shown in FIGS. 1 and 2, the flexible membrane 16 is positioned between the ledge 30 and the covers 28a,b, with the side 18 of the flexible membrane 16 in fluid communication with the fluid chamber 24. By cross-referencing FIGS. 2 and 3, it can be appreciated that the covers 28a,b contain one or more holes 36a,b to allow for fluid communication between the lumen 12 of the irrigation line 14 and the side 20 of the membrane 16.

Figure 4:
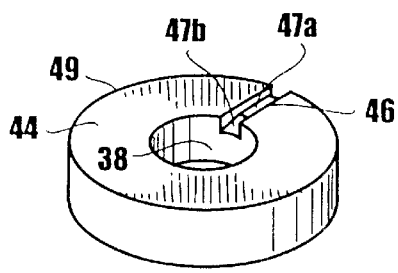
FIG. 4 is a perspective view of a portion of an outlet for the present invention showing the valve seat, aperture and slot.
Figure 5:
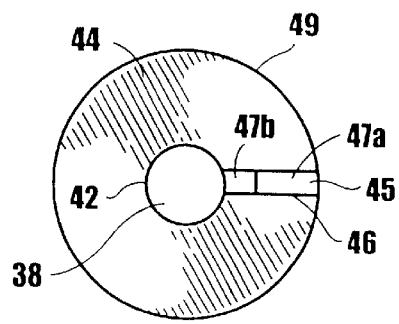
FIG. 5 is a plan view of a portion of an outlet for the present invention showing the valve seat, aperture, and slot.

By cross-referencing FIGS. 1 and 2, it can be seen that an outlet 38 is provided for the fluid chamber 24 to allow fluid to pass from the fluid chamber 24 to the outside 40 of the irrigation line 14. As shown, the outlet 38 includes an aperture 42 where fluid can enter the outlet 38 from the fluid chamber 24. The outlet 38 is further formed with a valve seat 44 surrounding the aperture 42. As shown in FIG. 2, the valve seat 44 is a surface, and preferably has a conical shape. In the preferred embodiment, the surface of the valve seat 44 is formed with a slot 46. As shown in FIGS. 4 and 5, the slot 46 is recessed from the surface of the valve seat 44 and may extend from the aperture 42 of the outlet 38 to the periphery 49 of the valve seat 44. As further shown in FIGS. 4 and 5, the slot 46 may have a rectangular cross-section and may have a bottom 45 that slopes towards the outlet 38. Preferably, the bottom 45 includes two segments 47a,b, each segment 47 varying in slope from the slope of the other segment 47. Further, a conical shaped valve 48 may be mounted to the side 18 of the flexible membrane 16 for cooperation with the valve seat 44 to form a seal, and for cooperation with the slot 46 to partially restrict flow through the slot 46. The valve 48 may be made from plastic, rubber or metal and may have a protective coating.

Figure 3:
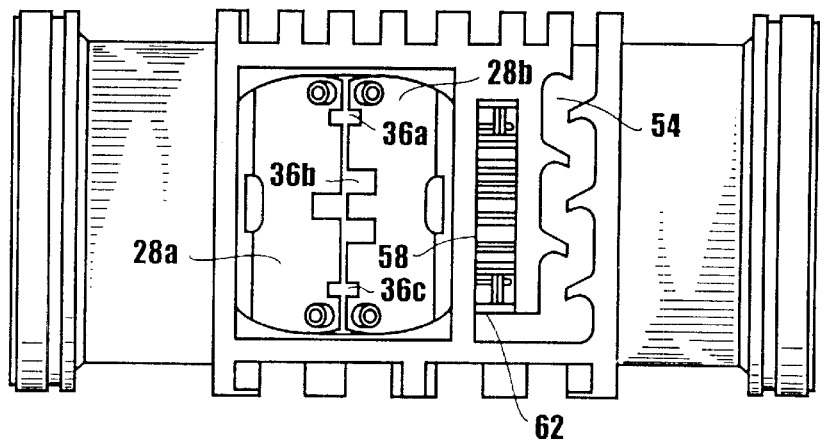
FIG. 3 is a plan view of an emitter having features of the present invention showing the filter, a portion of the labyrinth, and the covers of the fluid chamber.

Two passageways allow fluid from the lumen 12 of the irrigation line 14 to enter the fluid chamber 24 for subsequent exit from the irrigation line 14 through the outlet 38. The first passageway or flushing passageway 50, is a direct passageway from the lumen 12 of the irrigation line 14 to the fluid chamber 24. Importantly, the flushing passageway 50 enters the fluid chamber 24 from an entrance 52 located in the sidewall 26 between the ledge 30 and the covers 28. By cross-referencing FIGS. 1, 2 and 3, it can be appreciated the second passageway, or operational passageway 54, is formed as a labyrinth between the lumen 12 of the irrigation line 14 and the fluid chamber 24. Importantly, the operational passageway 54 enters the fluid chamber 24 from openings 56a,b in the sidewall 26 located between the ledge 30 and the aperture 42 of the outlet 38. As shown in FIG. 2, two openings 56a,b into the fluid chamber 24 from the operational passageway 54 may be provided. Also important for the present invention, the operational passageway 54 is formed to provide a greater total pressure reduction for fluid flowing through it than the flushing passageway 50. Any design features known in the pertinent art such as passageway length, cross section, obstacles or turns can be used to ensure that the operational passageway 54 reduces the fluid pressure in an amount greater than the corresponding pressure reduction in the flushing passageway. Further, as shown in FIGS. 1 and 3, the emitter 10 is formed with a filter 58 having a filter inlet 60 and a filter outlet 62. The filter inlet 60 is in fluid communication with the lumen 12 of the irrigation line 14 and the filter outlet 62 is in fluid communication with the operational passageway 54.

An alternate embodiment for the present invention is shown in FIGS. 6–9. It is to be appreciated that many of the structural features of the alternate embodiment are similar to features of the embodiment shown in FIG. 1. For example, in the alternate embodiment, the emitter 10' includes a flexible membrane 16'. Also, a sidewall 26' that extends from a first end 63' to a second end 64' partially surrounds the fluid chamber 24' and is further formed with a ledge 30' between the cover 28' and the fluid chamber 24'. Also shown, the ledge 30' is formed with a first portion 65' that extends into the fluid chamber 24' from the sidewall 26' and a second portion 66' that extends from the first portion 65'. Also similar to the FIG. 1 embodiment, the flexible membrane 16' is positioned between the ledge 30' and the covers 28'. Still further, an outlet 38' is provided for the fluid chamber 24', and the outlet 38' is formed with an aperture 42' where fluid can enter the outlet 38' from the fluid chamber 24'. Additionally, the outlet 38' is further formed with a valve seat 44' surrounding the aperture 42', and the valve seat 44' preferably has a conical shape and is formed with a slot 46'.

Unlike the embodiment shown in FIG. 1, the alternative embodiment does not include a conical shaped valve, but rather, the flexible membrane 16' is used to create a seal with the valve seat 44', and to partially restrict the flow through the slot 46'. Further, in the alternate embodiment, a channel 67' is formed behind the ledge 30' to interpose the ledge 30' between the channel 67' and the fluid chamber 24'.

Figure 6:
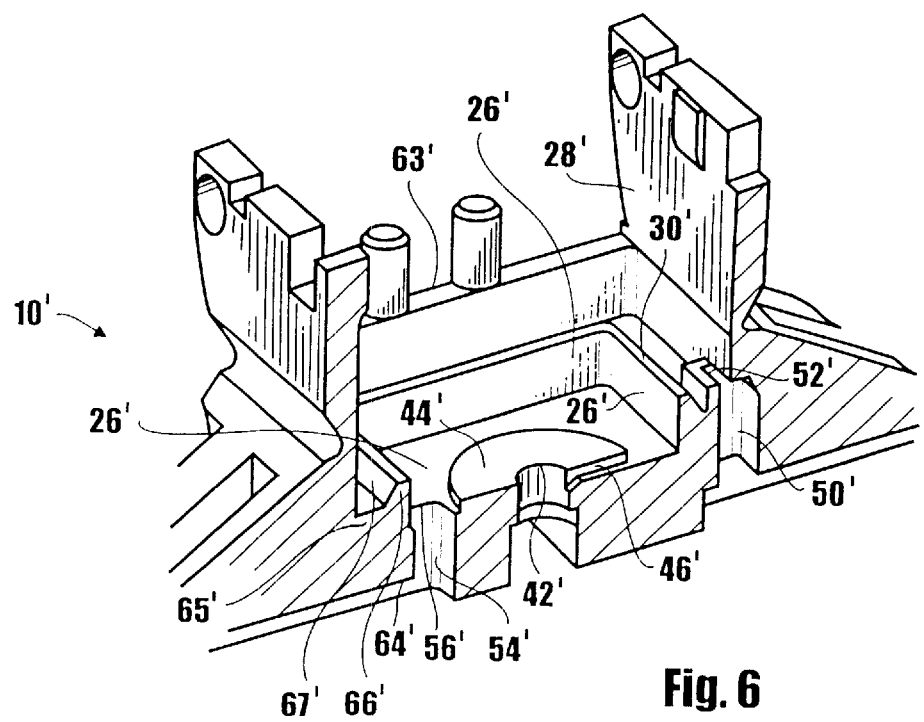
FIG. 6 is a perspective view in partial cross-section of a portion of an alternate embodiment of the present invention, corresponding to the side cross-sectional view of the device shown in FIG. 1, with the membrane removed to more clearly show the features of the fluid chamber.
Figure 7:
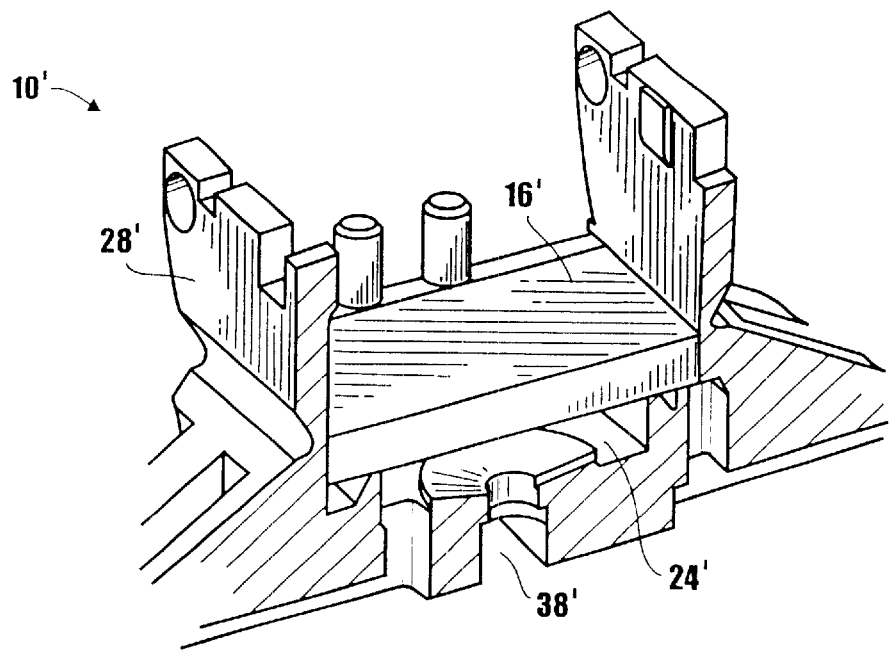
FIG. 7 is a perspective view in partial cross-section of a portion of an alternate embodiment as shown in FIG. 6, with a membrane positioned on the ledge.
Figure 8:
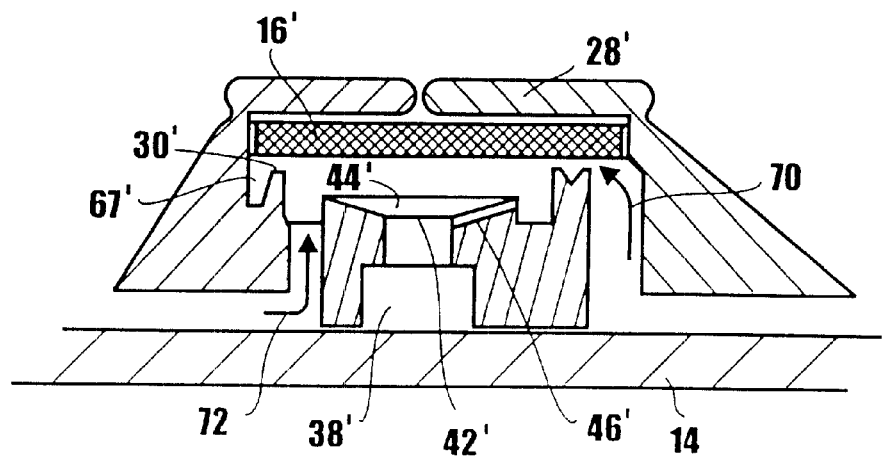
FIG. 8 is a cross-sectional view of the alternate embodiment shown in FIG. 7, showing the membrane as it is positioned during initial pressurization of the irrigation line.
Figure 9:
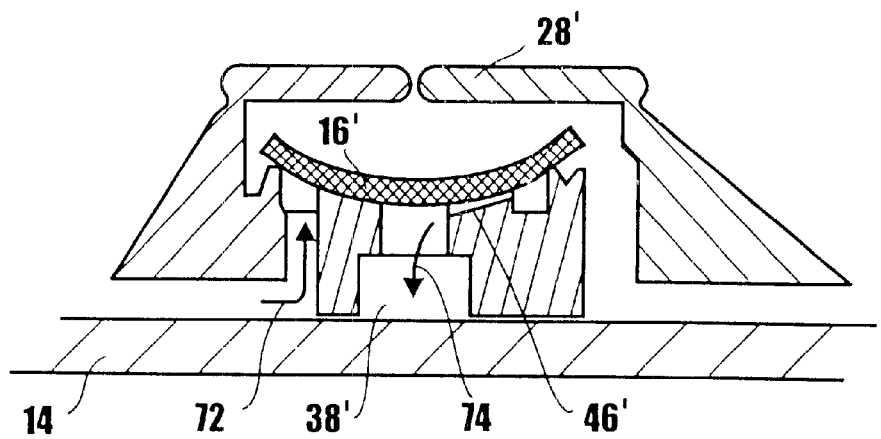
FIG. 9 is a cross-sectional view of the alternate embodiment as shown in FIG. 8, showing the membrane deformation that occurs in response to a large pressure differential between the lumen of the irrigation line and the fluid chamber.

The alternate embodiment also includes a flushing passageway 50' which is formed as a direct passageway, and an operational passageway 54' which is formed as a labyrinth. In the alternate embodiment, the operational passageway 54' enters the fluid chamber 24' from an opening 56' in the sidewall 26' located between the ledge 30' and the aperture 42' of the outlet 38'. Further, the flushing passageway 50' enters the fluid chamber 24' from an entrance 52' located in the sidewall 26' between the ledge 30' and the cover 28'. As shown in FIGS. 6 and 7, the flushing passageway 50' is in fluid communication with the channel 67'.

Referring now to FIG. 1, during operation fluid is fed into the lumen 12 of the irrigation line 14 from a fluid source (not shown). Initially, the pressure within the lumen 12 of the irrigation line 14 is low as the fluid from the source flows into the irrigation line 14 displacing trapped air. Gradually, the pressure will increase until a steady-state pressure is established in the lumen 12 of the irrigation line 14. During the initial pressurization of the irrigation line 14, the pressure on both sides of the flexible membrane 16 is low and the flexible membrane 16 does not deform or seal against any surfaces in the fluid chamber 24. This low pressure state is shown in FIG. 2, and in FIG. 8 for the alternate embodiment. Further, at low initial pressures, the flexible membrane 16 does not block either of the passageways 50, 54 into the fluid chamber 24. Consequently, fluid is able to travel through the flushing passageway 50 with little pressure reduction, and into the fluid chamber 24 where it effectively flushes any particulates from the fluid chamber 24, ledge 30, valve seat 44, aperture 42, slot 46 and outlet 38 to the outside 40 of the irrigation line 14. Specifically, fluid from the flushing passageway 50 is able to flow in the direction of arrow 68, between the ledge 30 and the flexible membrane 24 and into the fluid chamber 24. In the alternate embodiment shown in FIG. 8, fluid from the flushing passageway 50' first flows in the direction of arrow 70 into the channel 67', where the fluid subsequently flows from the channel 64' along a path between the ledge 30' and the flexible membrane 24' and into the fluid chamber 24'.

As the pressure within the irrigation line 14 gradually increases, the differential pressure between the line pressure on side 20 of the flexible membrane 16 and the reduced pressure in the fluid chamber 24 acting on the opposed side 18 of the flexible membrane 16 becomes significant. As this differential pressure begins to increase, several events take place. First, under small differential pressures, the flexible membrane 16 is forced against the ledge 30 of the fluid chamber 24 creating a seal that prevents fluid flowing through the flushing passageway 50 from entering the fluid chamber 24.

Next, as shown in FIG. 1, further increases in pressure differential will cause the flexible membrane 16 to deform and collapse into the fluid chamber 24, causing the valve 48 to come in contact with the valve seat 44. This partial blocking of the fluid chamber 24 and aperture 42 will reduce the flow of fluid from the operational passageway 54 through the fluid chamber 24 and into the outlet 38. Subsequent increases in pressure differential will cause the flexible membrane 16 to further deform resulting in the valve 48 forming a seal with the valve seat 44. At these pressure differentials, flow to the outside 40 of the irrigation line 14 is limited to fluid from the operational passageway 54. Specifically, fluid from the operational passageway 54 will flow in the direction of arrow 72 into the fluid chamber 24. Then, the fluid will flow from the fluid chamber 24 to the outlet 38 through the slot 46 of the valve seat 44. Finally, the fluid will flow through the outlet 38 in the direction of arrow 74 to the outside 40 of the irrigation tube 14. Additional increases in pressure differential will force the valve 48 into a portion of the slot 46, thereby partially restricting the flow of fluid through the slot 46. In the alternate embodiment shown in FIG. 9, the flexible membrane 16' forms a seal with the valve seat 44' and may penetrate into the slot 46' in response to large pressure differentials.

Pressure compensation is achieved as follows in the emitter 10 of the present invention. First, it is to be appreciated that as the pressure in the lumen 12 of the irrigation line 14 increases, the differential pressure across the flexible membrane 16 will increase. Also, as described above, as the differential pressure across the flexible membrane 16 increases, the flexible membrane 16 and valve 48 will cause the series of restrictions within the fluid chamber 24, with each restriction causing a further reduction of fluid flow through the outlet 38. At the same time, the increases in line pressure will cause the pressure of the fluid entering the fluid chamber 24 from the operational passageway 54 to increase. However, constant flow through the outlet 38 is achieved in spite of the varying line pressure because the increased pressure in the operational passageway 54 is offset by the restrictive effects of the flexible membrane 16 and valve 48.

While the particular self-cleaning, pressure compensating, irrigation drip emitter as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An emitter for controlling fluid flow from an irrigation line through a hole in the irrigation line, said emitter comprising:

an enclosing sidewall surrounding a volume, said sidewall having a first end, a second end and formed with a ledge therebetween wherein said ledge is formed by a first portion that extends into said volume from said sidewall and a second portion that extends from said first portion to create a channel between said second portion of said ledge and said sidewall;

an outlet for fluid communication with the hole in the irrigation line, said outlet extending into said volume between said ledge and said second end of said sidewall;

a membrane having a first surface and an opposed second surface, said membrane positioned in said volume between said first end of said sidewall and said ledge with said first surface of said membrane facing toward said outlet;

a first fluid passageway in fluid communication with said first surface of said membrane when said membrane is resting against said ledge, said first fluid passageway for flushing said emitter with fluid from the irrigation line during initial pressurization of the irrigation line; and second fluid passageway formed as a labyrinth and being in fluid communication with said volume between said ledge and said second end of said sidewall to cause said first surface of said membrane to experience a lower pressure than said opposed second surface during operational irrigation flow, said lower pressure for deforming said membrane into a configuration wherein said membrane engages said outlet during operational irrigation to control flow through the hole of the irrigation line.

2. An emitter as recited in claim 1 wherein said outlet is formed with a valve seat having a slot, said valve seat and slot for engaging said membrane during operational irrigation to compensate for pressure variations in the irrigation line and maintain a substantially constant flow through said outlet.

3. An emitter as recited in claim 1 wherein said second portion of said ledge has a decreasing cross section in a direction away from said first portion of said ledge.

4. An emitter as recited in claim 1 wherein said first fluid passageway is in fluid communication with said channel.

5. An emitter as recited in claim 1 wherein said first fluid passageway has a first length and said second fluid passageway has a second length and said first length is less than said second length.

6. An emitter as recited in claim 1 wherein said first fluid passageway is configured to direct fluid from the irrigation line towards said first surface of said membrane in a direction that is substantially normal to said first surface of said membrane when said membrane is resting against said ledge.

\* \* \* \* \*

UNITED STATES PATENT AND TRADEMARK OFFICE
CERTIFICATE OF CORRECTION

PATENT NO. : 6,464,152 B1
DATED : October 15, 2002
INVENTOR(S) : Christos Bolinis and Andreas Metaxas It is certified that error appears in the above-identified patent and that said Letters Patent is hereby corrected as shown below:

<u>Title page,</u>
Item [75], delete "Andreas Metaxes" insert -- Andreas Metaxas --

Signed and Sealed this

Tenth Day of December, 2002

JAMES E. ROGAN
*Director of the United States Patent and Trademark Office*